United States Patent [19]
Suzuki et al.

[11] Patent Number: 6,084,749
[45] Date of Patent: Jul. 4, 2000

[54] DISK DRIVE APPARATUS

[75] Inventors: Yuji Suzuki; Kazumi Munekata, both of Kanagawa, Japan

[73] Assignee: Sony Corporation, Tokyo, Japan

[21] Appl. No.: 08/103,677

[22] Filed: Aug. 10, 1993

[30] Foreign Application Priority Data

Aug. 17, 1992 [JP] Japan ................................ P04-217745

[51] Int. Cl.⁷ .................................................. G11B 5/54
[52] U.S. Cl. ................................................................ 360/105
[58] Field of Search .................................... 360/105, 106; 369/77.2, 244, 255, 215, 219, 220

[56] References Cited

U.S. PATENT DOCUMENTS

| | | | |
|---|---|---|---|
| 4,675,761 | 6/1987 | Ashbee et al. | 360/78 |
| 4,774,612 | 9/1988 | Okita et al. | 360/106 |
| 4,783,708 | 11/1988 | Hasegawa | 360/106 |
| 4,819,100 | 4/1989 | Asano | 360/106 |
| 4,849,840 | 7/1989 | Fujioka | 360/106 |
| 4,858,046 | 8/1989 | Maeda | 360/106 |
| 4,972,282 | 11/1990 | Noda et al. | 360/106 |
| 4,974,107 | 11/1990 | Liu et al. | 360/106 |

FOREIGN PATENT DOCUMENTS

| | | | |
|---|---|---|---|
| 74181 | 4/1986 | Japan | 360/106 |
| 2180983 | 4/1987 | United Kingdom . | |
| 8401466 | 4/1984 | WIPO . | |

*Primary Examiner*—George J. Letscher
*Attorney, Agent, or Firm*—Ronald P. Kananen; Rader, Fishman & Grauer

[57] ABSTRACT

A disk drive apparatus comprises a flat stepping motor for moving a head assembly, which is disposed under a disk cartridge in the inserted state thereof.

10 Claims, 6 Drawing Sheets

DISK DRIVE APPARATUS

BACKGROUND OF THE INVENTION

The present invention relates to a disk drive apparatus which is applicable to, for example, a floppy disk drive apparatus, etc.

A disk drive apparatus such as a floppy disk drive apparatus is widely used in a personal computer, an office computer, a word processor, etc., and presents remarkable diffusion.

FIG. 7 shows a conventional disk drive apparatus. Referring to FIG. 7, reference numeral 1 designates generally a chassis having a spindle motor shaft 2 as a center of disk rotation, which is housed, for example, in a device box (not shown) of a personal computer, etc., and formed by a bottomed box which is entirely open forward and has a housing space 1a into which a disk cartridge 3 is inserted. Erectly arranged to the bottom of the chassis 1 in a rear right side portion thereof are a holding wall 4 having a through hole 4a which is open in the longitudinal direction and a support shaft 5 which is parallel therewith at predetermined intervals, whereas protuberanly arranged to the bottom of the chassis 1 in a front end portion thereof are two spring engaging lugs 6 which are parallel with each other at predetermined intervals in the right and left direction. Moreover, the chassis 1 has both side walls formed with guide grooves 7 extending vertically, only two left ones of which being shown.

8 and 9 designate two pairs of protrusions parallel with each other at predetermined intervals in the longitudinal direction, which are mounted to the bottom of the chassis 1 for enabling a guiding of a slide plate as will be described later in the longitudinal direction. These pairs of protrusions 8, 9 are arranged parallel with each other at predetermined intervals in the left and right direction. The rear protrusions 9 have a conical cartridge positioning portion 9a having an outer diameter which is reduced to a pointed end, respectively.

10 designates a slide plate formed in a C-shape as viewed in a section thereof and having an ejector button 11 for ejecting the disk cartridge in a front edge right side portion thereof, which comprises a bottom plate 12 having a recess 12a formed in an U-shape as viewed in a plane thereof and opposed to the spindle motor shaft 2 and first long holes 12b opposed to the spring engaging lugs 6, and two side plates 13 erectly arranged to the bottom plate 12 in both side portions thereof and opposed to each other at predetermined intervals, and is movably disposed within the chassis 1.

The bottom plate 12 of the slide plate 10 has recesses 14 and second long holes 15 extending in the longitudinal direction and opposed to the protrusions 8, 9, and spring engaging holes 16 corresponding to the spring engaging lugs 6. Additionally, mounted to the bottom plate 12 of the slide plate 10 in a rear edge thereof is a lock claw 17 which protrudes downward.

On the other hand, the bottom plate 12 of the slide plate 10 has four cam grooves 18 which are inclined to rise diagonally forward. A rack 19 is arranged in the rear of the cam grooves 18 so as to extend in the longitudinal direction.

20 designates two tension coil springs for biasing the slide plate 10 forward, which have both ends engaged with the spring engaging lugs 6 and the spring engaging holes 16.

21 designates a trigger arm having an engaging surface 21a corresponding to the lock claw 17 and a guide surface 21b, which is rotatably arranged to the support shaft 5, and has an upper end face with which an arm manipulator 22 having a spring engaging protrusion 22a is integrally formed so as to protrude sideward.

23 designates a torsion spring for rotatably biasing the trigger arm 21 in the direction of engaging the slide plate 10, which has a coil portion disposed around the support shaft 5 and both ends engaged with the protrusion 22a and the holding wall 4.

24 designates a stepping motor for carrying out head carriage motion, which is fixed to the chassis 1 in a rear end portion thereof. The stepping motor 24 has an output shaft 25 constructed by a lead screw bar extending in the longitudinal direction and having a spiral V-shaped groove 25a, and a pointed end supported in the through hole 4a of the holding wall 4 through a bearing (not shown).

26 designates a guide bar extending in the longitudinal direction, which is held to the chassis 1 in a rear center portion thereof, and constructed to guide a head carriage as will be described later in the longitudinal direction.

27 designates the head carriage having a needle pin 28 which protrudes diagonally rearward and a plate spring 29 which presses the needle pin 28 in the V-shaped groove 25a of the output shaft 25, which is movably inserted into the guide bar 26 and disposed above the chassis 1. The head carriage 27 has a pointed end at which a first head 30 is held for reading information recorded on a disk, and a rear upper end at which a head arm 32 having a second head 31 corresponding to the first head 30 is swingably mounted through a resilient member 33. The head arm 32 is rotatably biased by a torsion spring 34 in the direction that the second head 31 approaches the first head 30, and has one side edge with which a stopper 32a for restricting arm rotation is integrally formed so as to protrude sideward.

36 designates a cartridge holder for removably holding the disk cartridge 3, which is arranged in the slide plate 10 to be movable upward and downward. The cartridge holder 36 has both side ends at which the cam grooves 18 and rollers 37 as a convex portion opposed to the guide grooves 7 are rotatably supported, and an upper end one side edge at which standing lug 38 having an engaging hole 38a which is open on either side is arranged. Additionally, the cartridge holder 36 is constructed to release an engagement of the lock claw 17 with the engaging surface 21a by pressing of the disk cartridge 3 toward the arm manipulator 22, to approach the bottom plate 12 with forward movement of the slide plate 10, and to separate from the bottom plate 12 with rearward movement of the slide plate 10 by pressing of the ejector button 11.

39 designates an arm for opening and closing a shutter 3a of the disk cartridge 3, which is rotatably arranged at the upper end one side edge of the holder 36. An engaging lug 40 is integrally formed with the arm 39 so as to protrude upward.

41 designates a tension coil spring for providing a return behavior to the arm 39, which has both ends engaged with the engaging lug 40 and the engaging hole 38a.

42 and 43 designate a switch for detecting a type of the disk D such as 2DD, 2HD and 2ED and a switch for detecting whether or not the disk D is writable, which are disposed on the chassis 1 through a base plate 44.

45 designates a reduction gear mechanism having a gear 46 engaged with the rack 19, which is disposed to the chassis 1 at the rear end side edge thereof.

47 and 48 designate positioning concave portions formed in a casing 3b of the disk cartridge 3, with which the protrusions 9 are engaged.

With the disk drive apparatus of this type, at the request for a reduction in size or request for a reduction in length dimension in recent years, the transverse head type that the head carriage 27 and the head arm 32 extend in the direction perpendicular to the inserted direction of the disk cartridge 3 is adopted instead of the so-called vertical head type that the head carriage 27 and the head arm 32 extend in the inserted direction of the disk cartridge 3.

There are two disk drive apparatus of the transverse head type: a disk drive apparatus in which the stepping motor 51 is disposed at the side of the inserted position of the disk cartridge 3 as shown in FIG. 8(A), and the head assembly 53 is moved by rotation of a lead screw 52 by driving of the stepping motor 51, and a disk drive apparatus in which the stepping motor 54 is disposed at the side of the inserted position of the disk cartridge 3 as shown in FIG. 8B, and the head assembly 56 is moved by movement of the rack 55 by driving of the stepping motor 54.

With such conventional disk drive apparatus, since the stepping motor 51, 54 was disposed at the side of the inserted position of the disk cartridge 3, the length dimension of the disk drive apparatus was reduce while the width dimension thereof was enlarged.

As a result appearance of a disk drive apparatus was not previously obtained with a reduction in size by decreasing not only the length dimension but the width dimension.

It is, therefore, an object of the present invention to provide a disk drive apparatus which enables a reduction in both length dimension and width dimension for thereby decrease a size thereof.

SUMMARY OF THE INVENTION

According to one aspect of the present invention, there is provided a disk drive apparatus for recording and reproducing an information signal on and from a recording medium pivotally received within a disk cartridge, the disk drive apparatus comprising:

a head assembly having a head arm for holding an upper head and a head carriage for carrying a lower head, said head arm and said head carriage extending in a direction perpendicular to an inserted direction of said disk cartridge, respectively; and a moving means for moving said head assembly in said inserted direction of said disk cartridge, said moving means being disposed below the disk cartridge, whereby a size of the disk drive apparatus is similar but slightly larger than a size of the disk cartridge.

According to another aspect of the present invention , there is provided a disk drive apparatus for recording and reproducing an information signal on and from a recording medium pivotally received within a disk cartridge, the disk drive apparatus comprising:

a head arm arranged for holding an upper head, said head arm extending in a direction perpendicular to an inserted direction of the disk cartridge;

a head carriage arranged for carrying a lower head, said head carriage comprising a head holding portion, a base portion on which said head arm is mounted, and a bearing portion interposed between said head holding portion and said base portion; and a guide shaft inserted into said bearing portion of said head carriage, said guide shaft guiding said head carriage in said inserted direction of the disk cartridge.

DETAILED DESCRIPTION OF THE INVENTION

Figure 7:
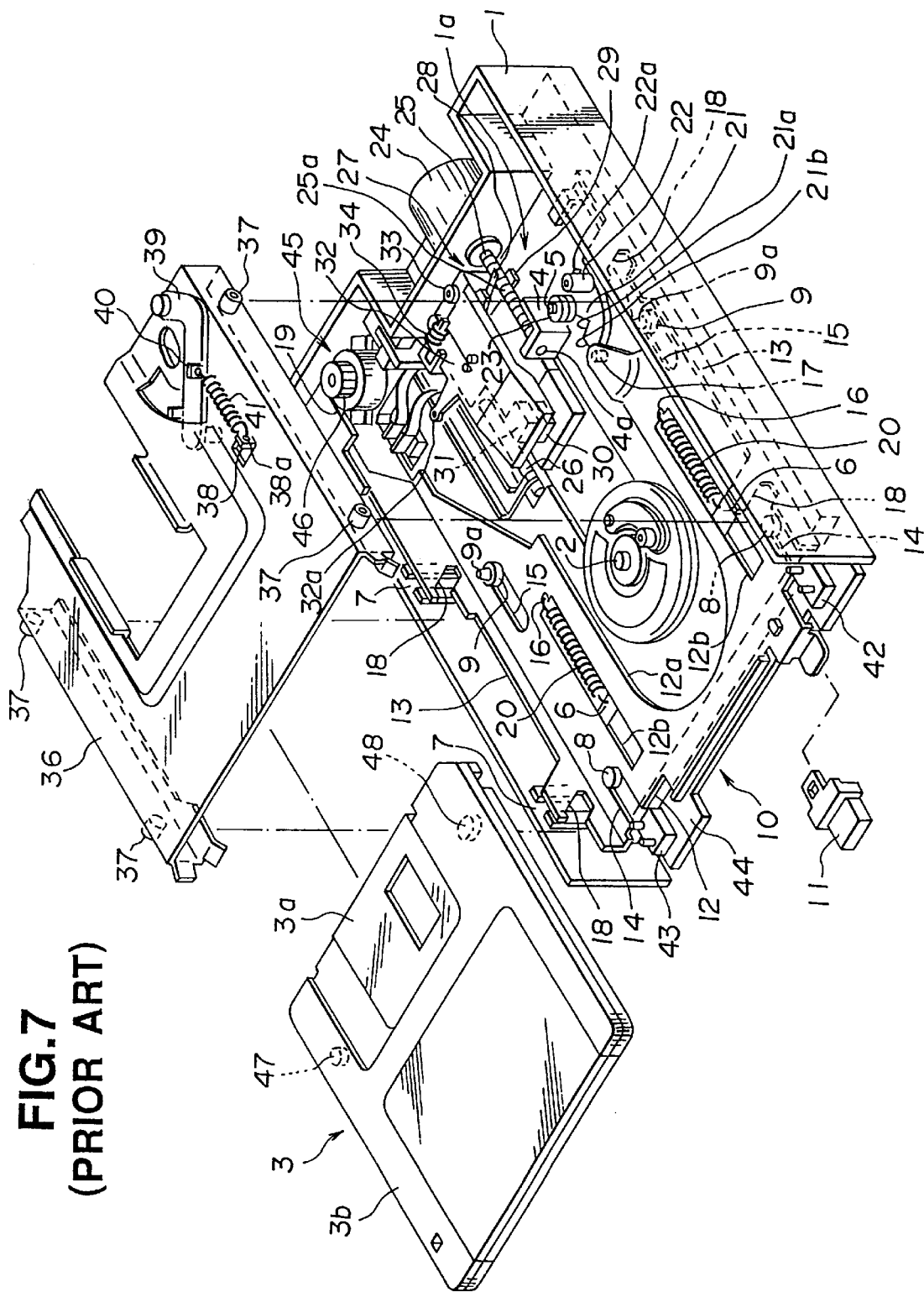
FIG. 7 is a view similar to FIG. 3, showing a conventional disk drive apparatus.
Figure 8:
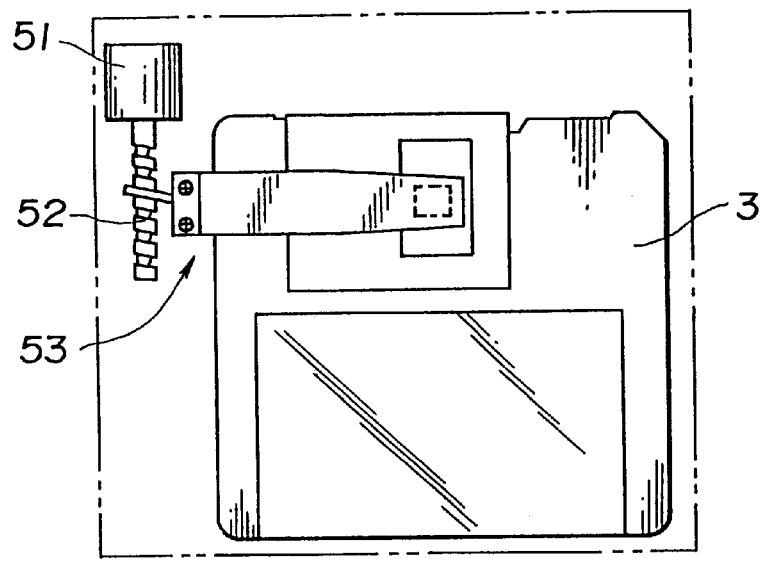
FIG. 8A is a view similar to FIG. 1B, showing the conventional disk drive apparatus.
FIG. 8B is a view similar to FIG. 8A, showing another conventional disk drive apparatus.
Figure 8:
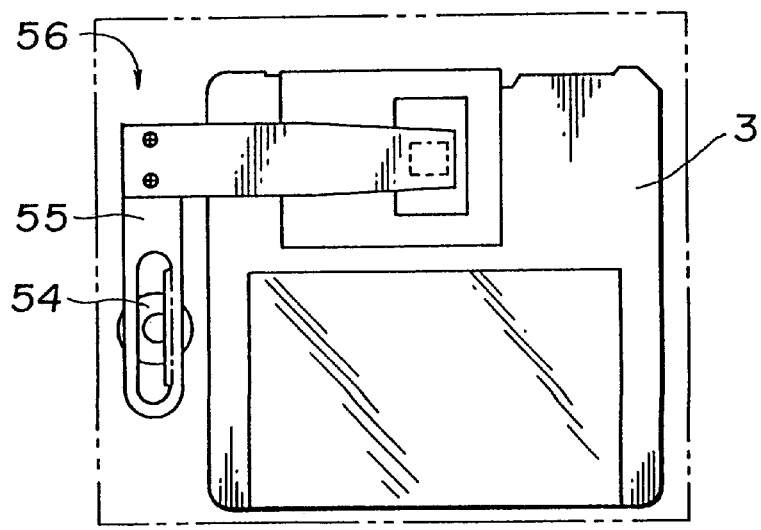

Referring to FIGS. 1 to 6 wherein like reference numerals in FIGS. 7 to 8B designate like parts, preferred embodiments of the present invention will be described.

Figures 1A, 1B:
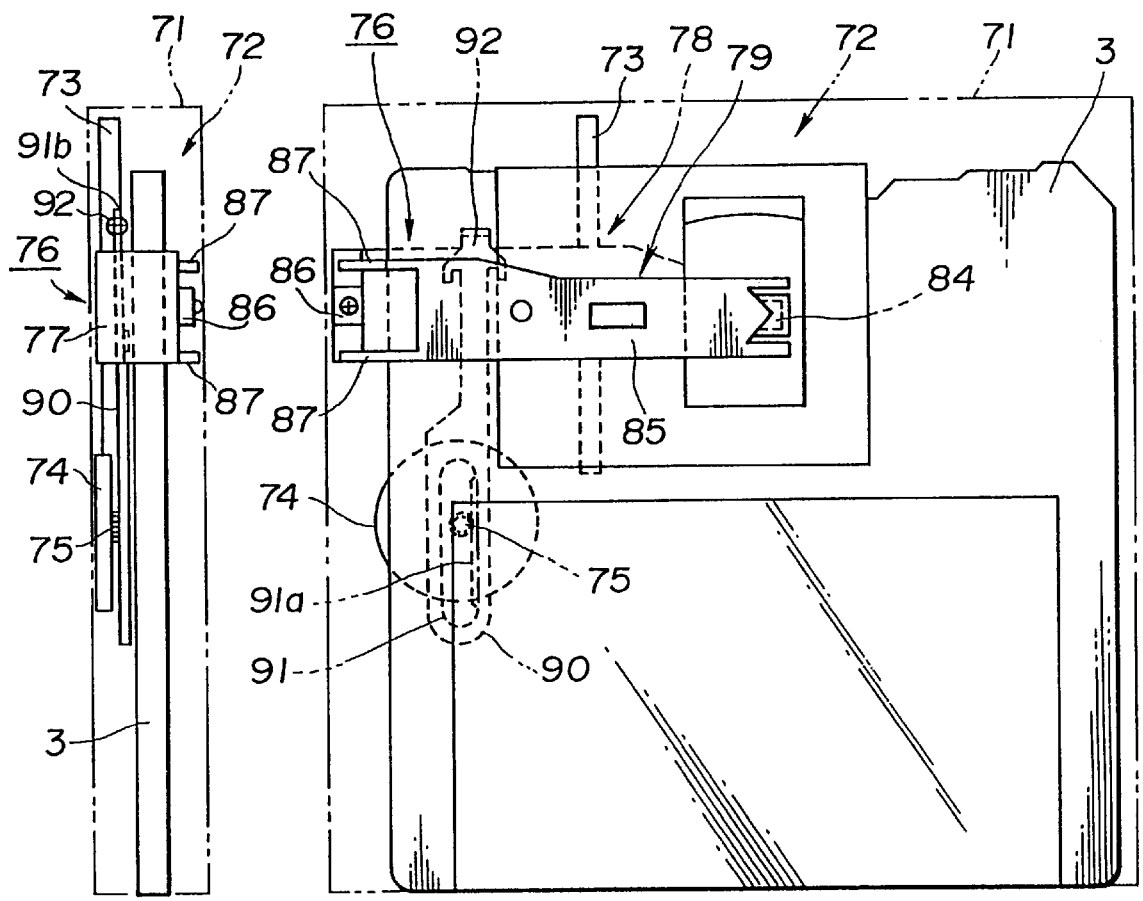
FIG. 1A is a side view showing a preferred embodiment of a disk drive apparatus according to the present invention.
FIG. 1B is a plan view showing the disk drive apparatus.

Referring first to FIGS. 1A and 1B, reference numeral 71 designates a box for a disk drive apparatus in which a housing space 72 is formed so as to enable insertion of a disk cartridge 3.

Figure 3:
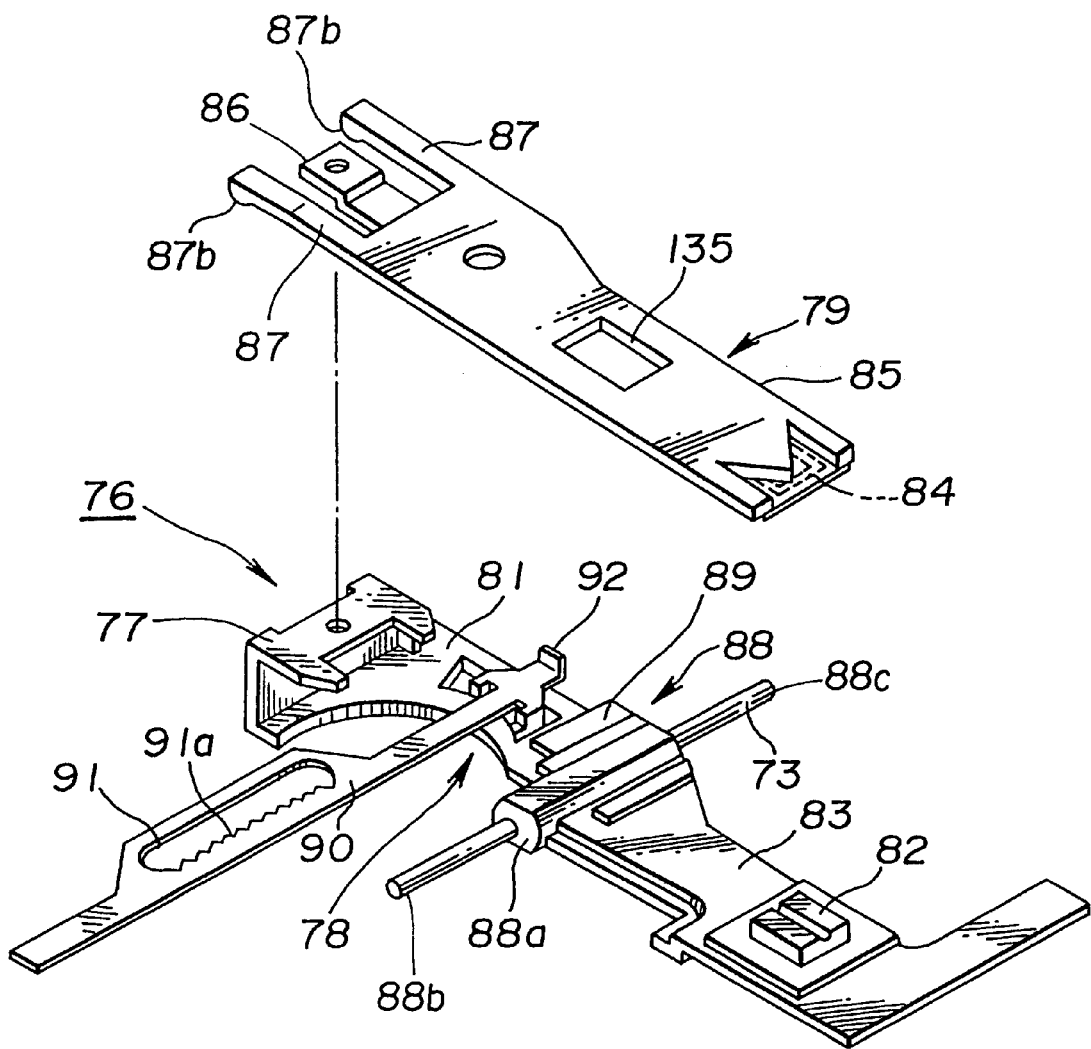
FIG. 3 is an exploded perspective view showing a head assembly of the disk drive apparatus.

Referring also to FIG. 3, 73 designates a guide shaft formed in a circle as viewed in a section thereof and extending in the longitudinal direction or inserted direction of the disk cartridge 3, which is housed in the box 71 on the left side of a rear portion thereof, and disposed under the disk cartridge 3 in the inserted state thereof.

74 designates a flat stepping motor which is arranged to the guide shaft 73 on the front left side thereof, and includes an ultrathin stepping motor having an outside size of, for example, a 20 mm outer diameter and a 2 mm thickness. The stepping motor 74 has an output shaft (not shown) to which is mounted a pinion 75 for transmitting motor driving force to a head assembly as will be described later.

Figure 2:
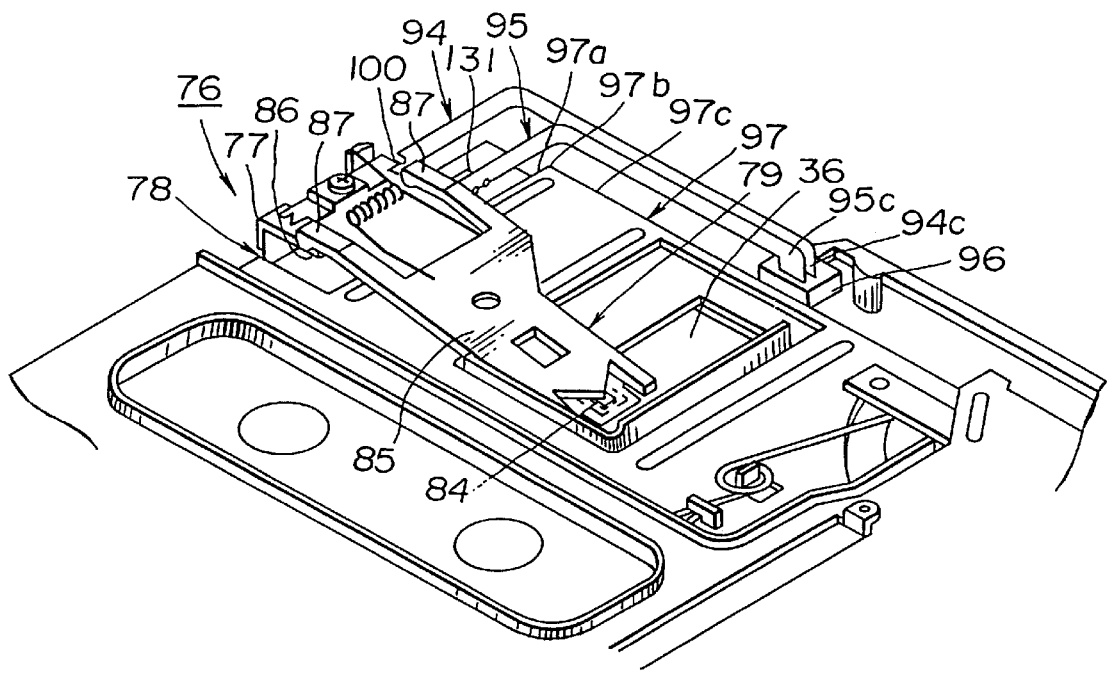
FIG. 2 is a perspective view showing the disk drive apparatus.

Referring particularly to FIGS. 2 and 3, 76 designates the head assembly formed substantially in a C-shape as viewed in a side face thereof, which comprises a head carriage 78 and a head arm 79 integrally formed with each other through a head arm support portion 77 and extending in the direction perpendicular to the inserted direction of the disk cartridge 3, and is movably arranged within the box 71.

The head carriage 78 of the head assembly 76 has a base lug 81 integrally arranged to the head arm support portion 77 and a head holding lug 83 for holding an S0 head 82 for reading information on the disk, which are divided in the extending direction of the head carriage 78. Additionally, referring to FIG. 4, the base lug 81 has a circular recess 93 for receiving the stepping motor 74 without a collision of the stepping motor 74 and the base lug 81 when the head carriage 78 is moved in a position where the S0 head traces the innermost circumferential of the disk.

On the other hand, as best seen in FIG. 3, the head arm 79 of the head assembly 76 comprises a second head holding lug 85 having a second head 84 corresponding to the first head 82, and a resilient lug 86 mounted to the second head holding lug 85 and fixed to the head arm support portion 77. The second head holding lug 85 of the head arm 79 is biased by the resilient lug 86 in the direction that the second head 84 approaches the first head 82. Additionally, two arm portions 87 are integrally formed with the second head holding lug 85 in rear edge side portions thereof, which are opposite to each other through the resilient lug 86 and have a protrusion 87b for pressing an upper end face of the head arm support portion 77.

Referring particularly to FIG. 3, 88 designates a bearing for connecting the two divided portions of the head carriage 78, which is mounted between the base lug 81 and the first head holding lug 83, and made of material having excellent slidability such as copper family sintered alloy, iron family sintered alloy, synthetic resin, etc. The bearing 88 comprises a bearing portion 88a into which the guide shaft 73 is inserted, and two mounting portions 88b, 88c which protrude on either side of the bearing portion 88a. A spring engaging lug 89 is integrally formed with the left one 88b of the two mounting portions 88b, 88c at a rear edge thereof so as to protrude rearward.

Figure 4:
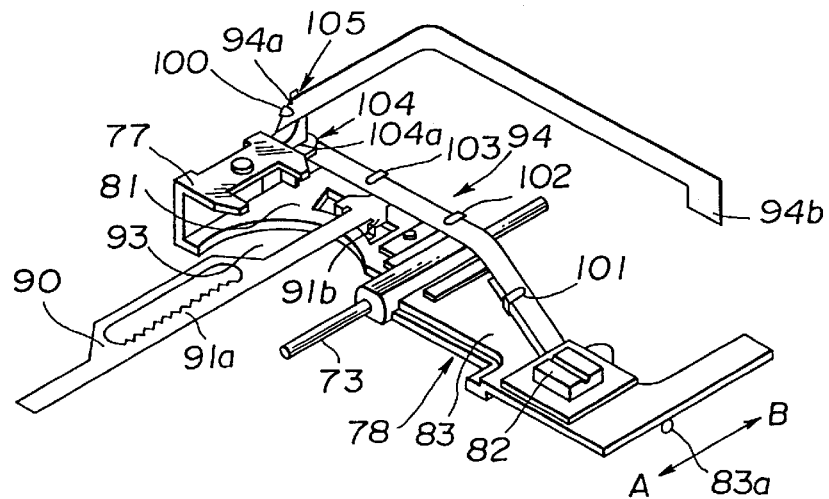
FIG. 4 is a view similar to FIG. 2, showing an S0 head flexible harness.

As best seen in FIGS. 3 and 4, 90 designates a link for transmitting motor driving force, which is slidably arranged to the support shaft 80. The link 90 has a front end formed with a long hole 91 extending in the longitudinal direction, in which a rack 91a is formed to be engaged with the pinion 75. Additionally, arranged to the link 90 at a rear end thereof is a resilient lug 92 for biasing the rack 91a to the pinion 75 and mounting the link 90 to the head carriage 78.

With the disk drive apparatus constructed as described above, since the head assembly 76 can be arranged closer to the center portion in the cross direction of the inserted position of the disk cartridge 3, not only the length dimension of the disk drive apparatus but the width dimension thereof can be reduced.

Moreover, in this embodiment, since the guide shaft 73 can be arranged closer to the inserted position of the disk cartridge 3 along the height direction, not only the length dimension of the disk drive apparatus but the height dimension thereof can be reduced.

Next, movement of the head assembly 76 in the present embodiment will be described.

Movement of the head assembly 76 is carried out by driving the stepping motor 74. Specifically, the pinion 75 is rotated by driving of the stepping motor 74, and torque thereof is transmitted to the rack 91a so that the link 90 is moved in the inserted direction of the disk cartridge 3. Then, the head assembly 76 is slid by this movement force along the guide shaft 73.

Additionally, a protrusion 83a is arranged to the S0 head holding lug 83 on the side opposite to the S0 head 82 so as to be in slide contact with the chassis. Specifically, upon, movement of the head carriage 78, the protrusion 83a is moved in being in slide contact with the chassis, so that the S0 head 82 can be moved parallel with the chassis with excellent slidability of the head carriage 78.

Next, a connection structure of flexible harness from the S0 head 82 and an S1 head 84 will be described.

Referring to FIG. 2, the S0 head 82 and the S1 head 84 are connected to a connector 96 of a printed board by an S0 head flexible harness 94 and an S1 head flexible harness 95, respectively.

The S0 head flexible harness 94 is formed into a thin band, and has one end connected to the S0 head 82 as shown in FIG. 2.

Referring also to FIG. 4, the S0 head flexible harness 94 is placed on an upper side of the head carriage 78, and led to an end of the head carriage 78 on the side of the head arm support portion 77, an in the vicinity of this end, it is bent substantially perpendicularly toward the head arm support portion 77 or in the upward direction.

The S0 head flexible harness 94 is bent substantially perpendicularly in the direction of head seek or direction of A–B in FIG. 4 in the vicinity of the head arm support portion 77, and this bent portion 94a is fixed to the head carriage 78 by a fixing member 100.

Additionally, as shown in FIG. 2, the S0 head flexible harness 94 has a portion ahead of the bent portion 94a which extends above a cassette holder 97 for holding a recording medium 36 such as a disk cassette, outside the cassette holder 97 and along one side face 97a thereof, and is bent perpendicularly at one corner 97b of the cassette holder 97, then extends further by a predetermined amount along the other side face 97c of the cassette holder 97 so that a connector inserting portion 94c arranged at an end of the S0 head flexible harness 94 is engaged with the connector 96.

Referring to FIG. 4, 101, 102, and 103 designate harness holding claws arranged to the head carriage 78, by which the S0 head flexible harness 94 is positioned and held on the head carriage 78.

104 and 105 designate first and second harness bending members arranged to the head carriage 78 for bending the S0 head flexible harness 94.

The first harness bending member 104 is disposed below the second harness bending member 105, and has one side face 104a by which the S0 head flexible harness 94 is bent substantially perpendicularly in the upward direction.

Figure 5:
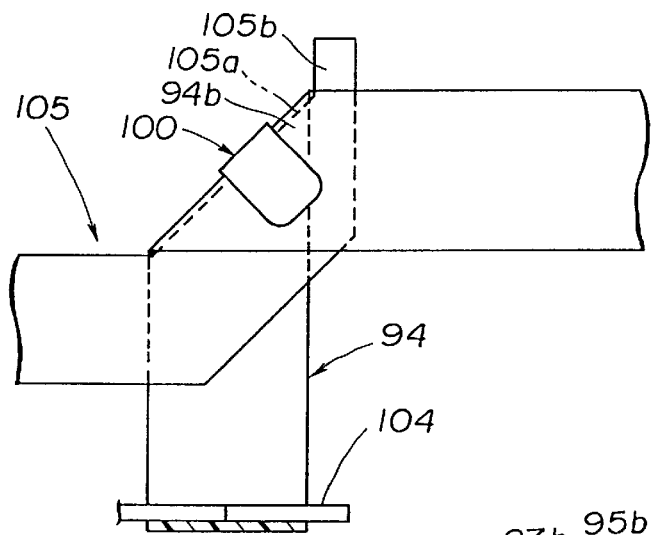
FIG. 5 is a view similar to FIG. 1A, showing the S0 head flexible harness with harness bending members.

Referring to FIG. 5, the second harness bending member 105 has an inclined surface of 45°.

When turning down the S0 head flexible harness 78 bent perpendicularly in the upward direction by the first harness bending member 104 from the back side of the second harness bending member 105 along the inclined surface 105a and a front surface 105b, the S0 head flexible harness 78 assumes naturally a state of being bent in the direction of head seek.

The fixing member 100 serves to press the bent portion 94a of the S0 head flexible harness 94 turned down by the second harness bending member 105 against the second harness bending member 105, and fix the bent portion 94a to the second harness bending member 105.

Next, the S1 head flexible harness 95 will be described.

Figure 6:
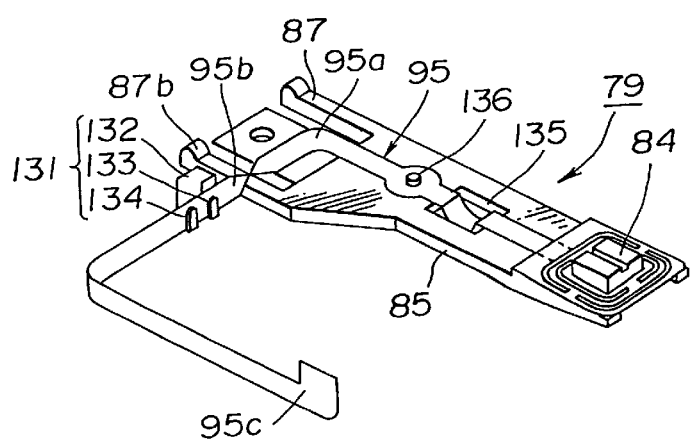
FIG. 6 is a view similar to FIG. 4, showing an S1 head flexible harness.

Referring to FIG. 6, the S1 head flexible harness 95 has one end connected to the S1 head 84.

The S1 head flexible harness 95 is placed on an underside of the head arm 79, and led to an end of the head arm 79 on the side of the head arm support portion 77, and in the vicinity of this end, it is bent in the direction of head seek through a bent portion 95a.

The S1 head flexible harness 95 has a 90° twisted portion 95b in the vicinity of the bent portion 95a.

The S1 head flexible harness 95, which changes from a horizontal state to a vertical state through the twisted portion 95b, is fixed to the head arm 79 by a fixing member 131.

The fixing member 131 comprises a main body 132 detachably mounted to the head arm 79 on one side face thereof, and a pair of clips 133, 134 mounted to the main body 132 on one side face thereof, and serves to hold the S1 head flexible harness 95 between the one side face of the main body 132 and the clips 133, 134 so as to position and fix the S1 head flexible harness 95 to the head arm 79.

Additionally, as shown in FIG. 2, the S1 head flexible harness 95 has a portion ahead of a spot fixed by the fixing member 131 which extends inside the S0 head flexible harness 94 and parallel therewith at predetermined intervals so that a connector inserting portion 95c arranged at an end of the S1 head flexible harness 95 is engaged with the connector 96.

Referring to FIG. 6, 135 and 136 designate harness engaging portions arranged to the head arm 79.

The connecting structure of the flexible harness is as described above, and thus the S0 head flexible harness 94 follows slide movement of the head carriage 78 by curving of a portion thereof between a spot fixed to the head carriage 78 by the fixing member 100 and a spot connected to the connector 96.

Likewise, the S1 head flexible harness 95 follows slide movement of the head carriage 78 by curving of a portion thereof between a spot fixed to the head arm 79 by the fixing member 131 and a spot connected to the connector 96 in a similar manner to the S0 head flexible harness 94.

The fixtures or fixing members 100, 131 of the S0 head flexible harness 94 and the S1 head flexible harness 95 are disposed parallel with the connector 96 at predetermined intervals, so that when being bent in following the head carriage 78, both of the S0 head flexible harness 94 and the S1 head flexible harness 95 are curved in a similar manner, preserving a space between the two flexible harness 94, 95 substantially at a predetermined value, resulting in sure prevention of contact and rubbing therebetween.

As described above, according to the present invention, since the disk drive apparatus provides a box into which a disk cartridge can be inserted, and a head assembly having a head arm and a head carriage movably arranged in the box and extending in the direction perpendicular to the inserted direction of the disk cartridge, in which a flat stepping motor is connected to the head assembly through a transmission mechanism, and disposed under the disk cartridge in the inserted state of the disk cartridge, the head assembly can be arranged closer to the center portion in the cross direction of the inserted position of the disk cartridge.

Therefore, the length dimension and the width dimension of the box can be decreased, resulting in a reduction in size of the disk drive apparatus.

Moreover, since the head carriage of the head assembly is dividedly formed in the extending direction of the head carriage, and a bearing into which a guide shaft for guiding the head assembly is inserted is interposed between the two divided portions of the head carriage, the guide shaft can be arranged closer to the inserted position of the disk cartridge along the height direction.

Therefore, the height dimension, as well as the length and width dimension of the box can be decreased, resulting in a reduction in size of the disk drive apparatus.

What is claimed is:

1. A disk drive apparatus for recording and reproducing an information signal on and from a recording medium pivotally received within a disk cartridge, the disk drive apparatus comprising:

a head assembly having a head arm for holding an upper head and a head carriage for carrying a lower head, said head arm and said head carriage being connected together on a lateral side of the disk cartridge and extending in a direction perpendicular to an inserted direction of said disk cartridge, respectively; and a moving means for moving said head assembly in said inserted direction of said disk cartridge, said moving means being disposed below and substantially within a length and width of the disk cartridge, whereby a length and width of the disk drive apparatus is similar but slightly larger than the length and width of the disk cartridge;

said moving means comprising a flat stepping motor having a pinion gear, and a link member protruding from said head carriage and having a rack gear, said rack gear being engaged with said pinion gear;

said head carriage comprising a head holding portion, a head arm support portion on which said head arm is mounted, a base lug portion, and a bearing portion interposed between said head holding portion and said base lug portion;

said base lug portion of the head carriage having a recess for fitting around a perimeter of the flat stepping motor for avoiding a collision of said head carriage and said flat stepping motor when said head carriage is moved in a position where said lower head traces the innermost circumference of the recording medium.

2. A disk drive apparatus for recording and reproducing an information signal on and from a recording medium pivotally received within a disk cartridge, the disk drive apparatus comprising:

a head arm arranged for holding an upper head, said head arm extending in a direction perpendicular to an inserted direction of the disk cartridge;

a head carriage arranged for carrying a lower head, said head carriage comprising a head holding portion, a base portion on which said head arm is mounted, and a bearing portion interposed between generally coplanar portions of said head holding portion and said base portion; and a guide shaft inserted into said bearing portion of said head carriage, said guide shaft guiding said head carriage in said inserted direction of the disk cartridge.

3. A disk drive apparatus as claimed in claim 2, wherein said bearing portion of said head carriage is made of a material having high slidability.

4. A disk drive apparatus as claimed in claim 3, wherein said material of said bearing portion includes a sintered alloy.

5. A disk drive apparatus for recording and reproducing an information signal on and from a recording medium pivotally received within a disk cartridge, the disk drive apparatus comprising:

a head assembly having a head arm for holding an upper head and a head carriage for carrying a lower head, said head arm and said head carriage being connected together on a lateral side of the disk cartridge and extending in a direction perpendicular to an inserted direction of said disk cartridge, respectively; and a moving means for moving said head assembly in said inserted direction of said disk cartridge, said moving means being disposed substantially within a length and width of the disk cartridge;

wherein said head carriage comprises a head holding portion, a base portion on which said head arm is mounted, and a bearing portion inter posed between, and substantially coplanar with, said head holding portion and said base portion.

6. The disk drive apparatus as set forth in claim 5, further comprising a guide shaft inserted into said bearing portion of said head carriage, said guide shaft guiding said head carriage in said inserted direction of the disk cartridge.

7. The disk drive apparatus as set forth in claim 6, wherein said bearing portion is interposed between generally coplanar portions of said head holding portion and said base portion so as to minimize the overall height of the disk drive apparatus.

8. The disk drive apparatus as set forth in claim 7, wherein said moving means comprises a flat stepping motor having a pinion gear, and a link member protruding from said base portion of the head carriage and having a rack gear, said rack gear being engaged with said pinion gear.

9. A disk drive apparatus for recording and reproducing an information signal on and from a recording medium pivotally received within a disk cartridge, the disk drive apparatus comprising:

a head assembly having a head arm for holding an upper head and a head carriage for carrying a lower head, said head arm and said head carriage being connected together on a lateral side of the disk cartridge and extending in a direction perpendicular to an inserted direction of said disk cartridge, respectively; and a moving means for moving said head assembly in said inserted direction of said disk cartridge, said moving means being disposed below and substantially within a length and width of the disk cartridge, whereby a length and width of the disk drive apparatus is similar but slightly larger than the length and width of the disk cartridge;

said head carriage comprising a head holding portion, a head arm support portion on which said head arm is mounted, a base lug portion, and a bearing portion interposed between said head holding portion and said base lug portion;

a guide shaft inserted into said bearing portion of said head carriage, said guide shaft guiding said head carriage in said inserted direction of the disk cartridge;

said bearing portion being interposed between generally coplanar portions of said head holding portion and said base lug portion so as to minimize the overall height of the disk drive apparatus;

said moving means comprising a flat stepping motor having a pinion gear, and a link member protruding from said base lug portion of the head carriage and having a rack gear, said rack gear being engaged with said pinion gear;

said base lug portion of the head carriage having a recess for fitting around a perimeter of the flat stepping motor for avoiding a collision of said head carriage and said flat stepping motor when said head carriage is moved in a position where said lower head traces the innermost circumference of the recording medium.

10. The disk drive apparatus as set forth in claim 2, wherein said generally coplanar portions of said head holding portion and said base portion are generally coplanar with said bearing portion, said coplanar portions being disposed beneath said disk cartridge and parallel to a plane containing said disk cartridge.

* * * * *